July 10, 1956
J. W. MACKEY
2,754,145
DISPOSAL DEVICE FOR CIGARETTE AND CIGAR
ASHES, BUTTS, AND THE LIKE
Filed June 22, 1954
2 Sheets-Sheet 2
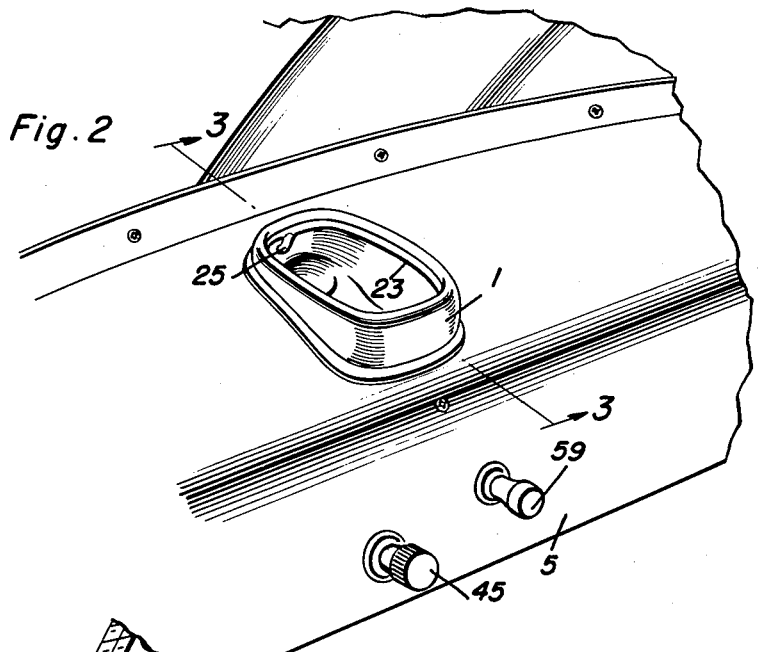
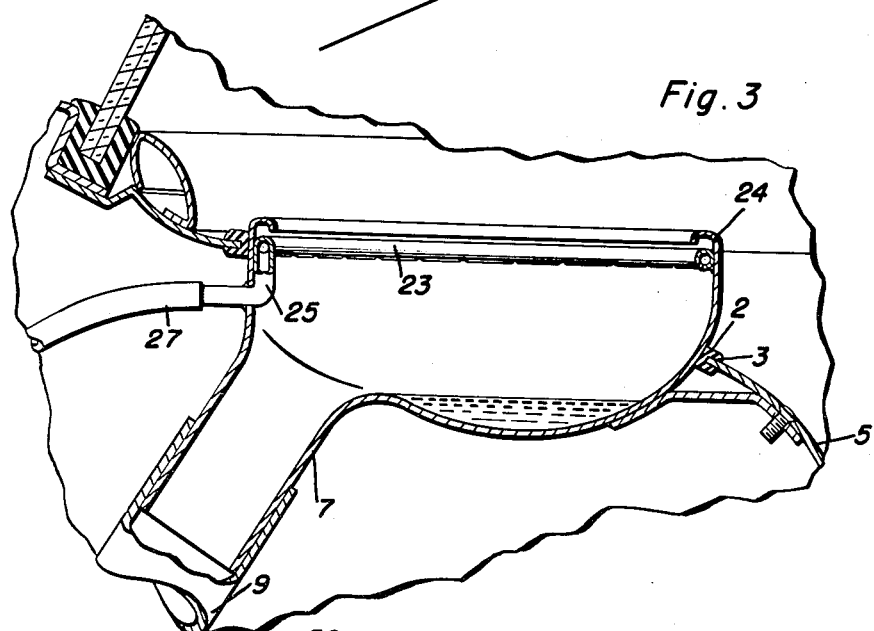
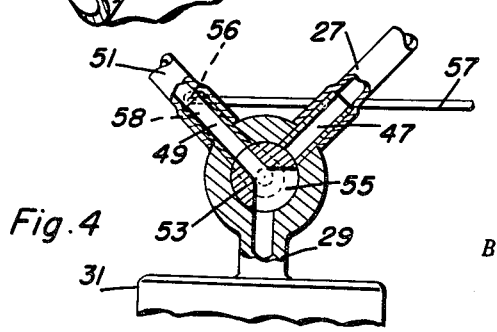
John W. Mackey
INVENTOR.

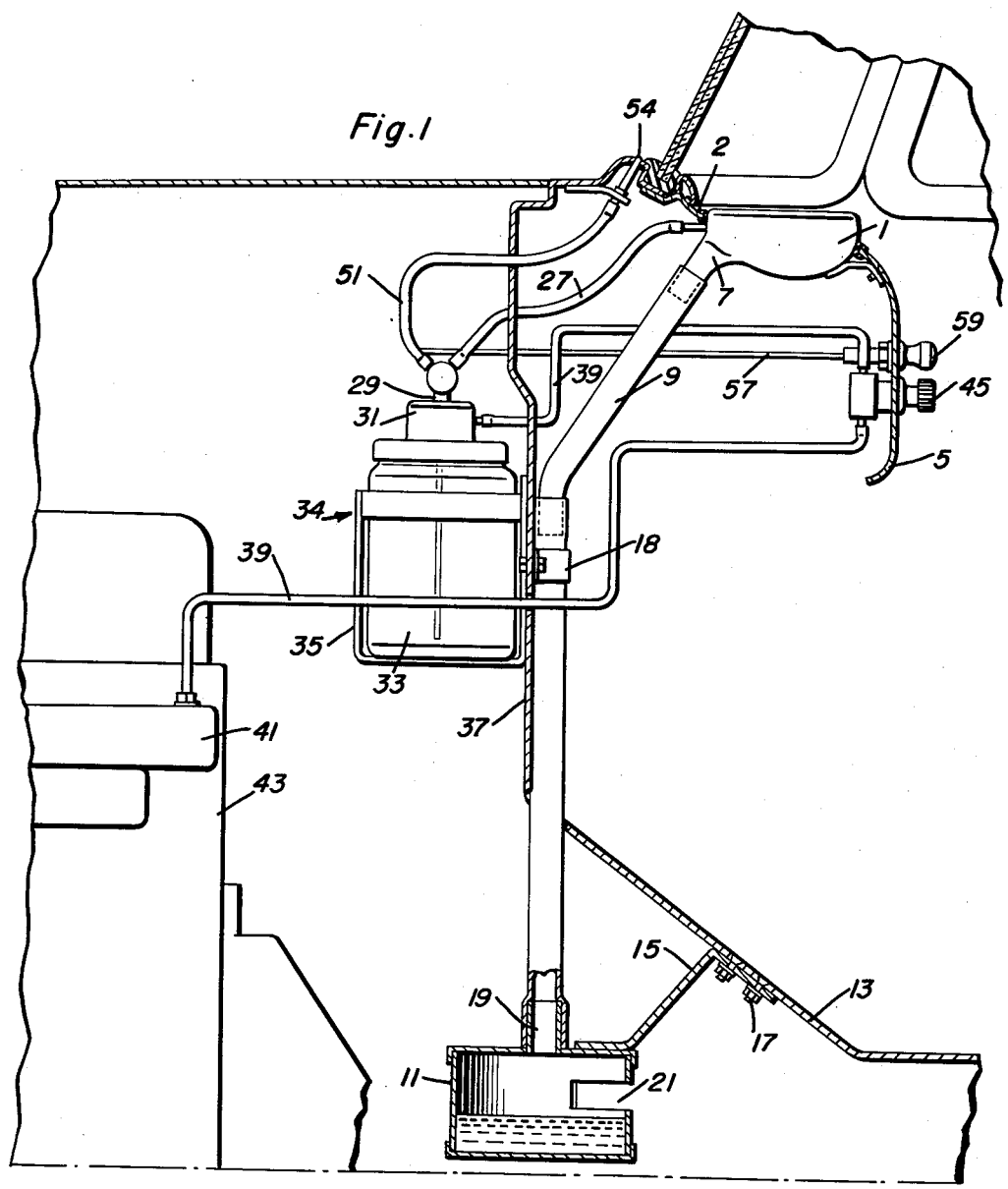

United States Patent Office 2,754,145
Patented July 10, 1956

2,754,145

DISPOSAL DEVICE FOR CIGARETTE AND CIGAR ASHES, BUTTS, AND THE LIKE

John W. Mackey, Buckley, Wash.

Application June 22, 1954, Serial No. 438,496

3 Claims. (Cl. 296—1)

My invention relates to improvements in disposal devices for installation on automobiles to dispose of cigarette, and cigar ashes, butts, and burnt matches.

The primary object of my invention is to provide a device for the above purpose embodying a receptacle for the ashes, butts and matches, a disposal sump overflowing to discharge onto the road and means for flushing, at will, the contents of the receptacle into the sump by liquid under pressure for disposal therefrom with any sparks, or fire, quenched by the liquid.

Another object is to provide in such a device for utilizing the conventional windshield washing apparatus for flushing purposes and without interfering with its operation in washing the windshield.

Still another object is to provide a device adapted for accomplishing the above and which can be installed in an automobile without material alteration of the automobile or the windshield washing apparatus.

Other and subordinate objects will become apparent when the following description and appended claims are read with reference to accompanying drawings.

In said drawings:

Figure 1 is a fragmentary view partly in side elevation and partly in vertical section of my invention installed;

Figure 2 is an enlarged fragmentary view in perspective illustrating the manner in which a bowl forming part of the device is mounted in the instrument panel of the automobile and also illustrating an operating button and valve for the device at the instrument panel;

Figure 3 is a fragmentary further enlarged view in transverse section taken on the line 3—3 of Figure 2; and Figure 4 is an enlarged fragmentary view in vertical section partly in side elevation of a valve and associated parts forming part of the device.

Referring to the drawings by numerals my improved disposal device comprises a receiving bowl 1 seated in a gasket 2 suitably fixed in a recess 3 in the top portion of the instrument panel 5 of an automobile and which is formed with a downwardly and forwardly inclined discharge throat 7.

The discharge throat 7 discharges into a vertical tube 9 depending therefrom and suitably connected thereto and which discharges into a sump tank 11 below the floor boards 13 and mounted thereon by a suitable bracket 15 fixed to said tank 11 and fastened to a floor board, as at 17. Preferably the tube 9 is sleeved at its upper end over the throat 7 and has its lower end sleeved over a nipple 19 on the top of said tank. The sump tank 11 is provided with a side overflow slot 21 suitably spaced above its bottom. A clamp 18 secures the tube 9 to the fire wall 37.

Flushing means for the bowl 1 is provided as follows. A perforated spray tube 23 is suitably fixed in the rolled rim 24 of the bowl 1 to extend around the same and spray downwardly against the side wall of said bowl and is provided with an inlet nipple 25 connected by a pressure line 27 and a valve 29 to the output side of the pump 31 on the liquid reservoir 33 of a conventional windshield washing apparatus 34.

The windshield washing apparatus 34 is of the usual well known type in which the reservoir 33 is supported by a holder 35 on the front of the fire wall 37 of the automobile. A suction line 39 connects the pump 31 to the manifold 41 of the automobile engine 43 for operation of the pump by vacuum created in said manifold 41 and said line 39 is suitably extended through the fire wall 37 to a pump control valve 45 on the instrument panel 5.

The valve 29 is of Y construction with the pressure line 27 connected to one branch 47. The other branch 49 has connected thereto the usual liquid pressure line 51 for feeding liquid from the pump 31 to the usual windshield washing nozzle 54. A rotary valve core 53 in said valve 29 is ported as at 55 to communicate said branches 47, 49 with the discharge side of the pump 31 upon rotation of said core in opposite directions respectively.

A rod 57 is operatively connected, as at 56, to an operating crank 58 on the core 53 and extends through the fire wall 37 to an operating button 59 at the instrument panel 5.

In operation, ashes, stubs and burnt matches are deposited in the bowl 1 and flushed therefrom as an incident to operation of the valve 29 by the rod 57 into the sump tank 11. Thus all fire and sparks in the device are quenched. When the level of liquid rises in the sump tank 11 the tank overflows through the slot 21 and discharges onto the road or the like.

The foregoing will, it is believed, suffice to impart a clear understanding of my invention without further explanation.

Manifestly the invention is susceptible of modification without departing from the inventive concept and right is herein reserved to modifications falling within the scope of the appended claims.

What is claimed as new is as follows:

1. A disposal device comprising a bowl set into the instrument panel of an automobile to contain cigarette and cigar ashes and butts and burnt matches, an overflow discharge sump tank discharging at a fixed level to atmosphere and suspended from a floor board of the automobile, below said bowl, means connecting the bowl and sump tank in commmunication for discharge of the bowl into the sump tank, and liquid spray discharge means carried by the automobile and connected to said bowl to flush the same for washing the contents of the bowl into the sump tank.

2. A disposal device according to claim 1, said sump tank having a side overflow opening to atmosphere for establishing said fixed level and discharge of contents of the sump tank onto the road.

3. A disposal device according to claim 1, said liquid discharge means comprising a pump remote from said bowl, a valve on said pump operative to control discharge from the pump, and a valve control rod operatively connected to said valve and extending from said valve to the instrument panel for operation at said panel.

References Cited in the file of this patent

UNITED STATES PATENTS

| | | |
|---|---|---|
| 1,623,140 | Travis | Apr. 5, 1927 |
| 1,966,774 | Uitto | July 17, 1934 |
| 2,556,370 | Holmes | June 12, 1951 |
| 2,663,504 | Hooker | Dec. 22, 1953 |